US011842351B2

(12) United States Patent
Benkreira et al.

(10) Patent No.: US 11,842,351 B2
(45) Date of Patent: Dec. 12, 2023

(54) SYSTEMS AND METHODS FOR FRAUD MONITORING

(71) Applicant: Capital One Services, LLC, McLean, VA (US)

(72) Inventors: Abdelkader Benkreira, Washington, DC (US); Tyler Maiman, Melville, NY (US); Brendan Way, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/409,043

(22) Filed: Aug. 23, 2021

(65) Prior Publication Data

US 2023/0059064 A1  Feb. 23, 2023

(51) Int. Cl.
*G06Q 20/40* (2012.01)
*G06Q 20/38* (2012.01)
*G06N 20/00* (2019.01)
*G06F 18/214* (2023.01)
*H04L 9/40* (2022.01)

(52) U.S. Cl.
CPC ....... *G06Q 20/4016* (2013.01); *G06F 18/214* (2023.01); *G06N 20/00* (2019.01); *G06Q 20/389* (2013.01)

(58) Field of Classification Search
None
See application file for complete search history.

(56) References Cited

U.S. PATENT DOCUMENTS

| | | | |
|---|---|---|---|
| 8,412,605 B2 * | 4/2013 | Griffin | G06Q 20/4016 705/76 |
| 8,600,872 B1 | 12/2013 | Yan | |
| 8,793,188 B2 | 7/2014 | Larkin | |
| 10,504,093 B1 | 12/2019 | Lewis et al. | |
| 10,510,080 B2 | 12/2019 | Ranganath et al. | |
| 2008/0140576 A1 * | 6/2008 | Lewis | G06Q 20/4016 707/999.107 |
| 2012/0047072 A1 | 2/2012 | Larkin | |
| 2014/0108251 A1 | 4/2014 | Anderson et al. | |
| 2017/0236121 A1 * | 8/2017 | Lyons | G06Q 20/3829 705/71 |

(Continued)

*Primary Examiner* — Bruce I Ebersman
*Assistant Examiner* — Bhavin D Shah
(74) *Attorney, Agent, or Firm* — HUNTON ANDREWS KURTH LLP

(57) ABSTRACT

Systems and methods for fraud monitoring are disclosed, including: receiving a transaction request associated with a first instrument of a user; extracting, characteristics of the transaction request; identifying, by the first processor, user data based on the transaction request; determining a fraud severity value and notification value based on inputting the characteristics and user data into a fraud machine learning model; performing a first fraud action based on the fraud severity value; wherein the first fraud action is at least one selected from the group of locking the first instrument for a period of time, deactivating the first instrument, and electronically transmitting a first query message to a user device associated with the first instrument; and transmitting a fraud notification based on the notification value, wherein the fraud notification includes severity information associated with the fraud severity value.

20 Claims, 6 Drawing Sheets

(56) References Cited

U.S. PATENT DOCUMENTS

| | | | | |
|---|---|---|---|---|
| 2019/0147477 A1* | 5/2019 | Nazarowski | ....... | G06Q 30/0226 |
| | | | | 705/14.27 |
| 2020/0044851 A1* | 2/2020 | Everson | ............... | G06Q 20/401 |
| 2020/0193018 A1* | 6/2020 | Van Dyke | ............. | G06F 21/552 |
| 2020/0250675 A1* | 8/2020 | Hanis | ................. | G06Q 20/4016 |

* cited by examiner

SYSTEMS AND METHODS FOR FRAUD MONITORING

FIELD OF THE DISCLOSURE

The present disclosure is generally related to fraud prevention, and more specifically, systems and methods for fraud detection, assessment, and the transmission of fraud-prevention notifications.

BACKGROUND

Many entities, including financial institutions, monitor the activity of their account holders to prevent fraud. For example, an account holder's credit card can be stolen, and a large and/or unusual transaction can indicate to the entity issuing the credit card that fraud has occurred. As another example, a transaction taking place in a city than different than the city of residence for the account holder can be indicative of fraud. The issuing entity can then take certain remedial actions, such as declining transactions and locking account holder's credit card.

Account holders will often have multiple payment cards, and other instruments, which can affected by a fraudulent event, such as the theft of a wallet or identity theft. Currently, there is no adequate way to efficiently and effectively communicate fraud events to a plurality of disparate issuing entities and other institutions that can be affected by such events.

These and other deficiencies exist. Accordingly, there is a need to develop methods of monitoring transaction and other data to determine fraud events and to identify and take action with respect to a number of affected entities against potential further fraud relating to a plurality of other accounts payment instruments.

SUMMARY OF THE DISCLOSURE

Embodiments of the present disclosure provide an system, method, and a non-transitory computer-accessible medium having stored thereon computer-executable instructions for fraud monitoring.

Exemplary embodiments can include a computer-implemented method for fraud monitoring, comprising: receiving, by a first processor, a transaction request associated with a first instrument of a user; extracting, by the first processor, characteristics of the transaction request; identifying, by the first processor, user data based on the transaction request; determining, by the first processor, a fraud severity value and notification value based on inputting the characteristics and user data into a fraud machine learning model; performing a first fraud action, by the first processor, based on the fraud severity value; wherein the first fraud action is at least one selected from the group of locking the first instrument for a period of time, deactivating the first instrument, and electronically transmitting a first query message to a user device associated with the first instrument; and transmitting, by the first processor, a fraud notification based on the notification value to a second processor associated with a second instrument of the user over a network, wherein the fraud notification includes severity information associated with the fraud severity value.

Further exemplary embodiments include that the fraud notification is transmitted when the notification value exceeds a first notification threshold. In addition, the method can further comprise electronically transmitting, by the first processor, a second query message to the user device associated with the first instrument when the notification value is less than the first notification threshold and greater than a second notification threshold.

In further exemplary embodiments, the method can further comprise, wherein the fraud machine learning model is trained with a training set comprising transaction data associated with each of a plurality of instruments. The training set can further comprise fraud impact data associated with each of the plurality of instruments.

In further exemplary embodiments, the training set further comprises at least one of a fraud status and fraud type associated with each of the plurality of instruments. In addition, the transaction data is retrieved by the first processor from a distributed ledger of a decentralized network. Further, the transaction data includes information received from at least one second fraud notification transmitted by the second processor to the first processor over the network. In addition, the network is a financial consortium network. Further, the first fraud action includes locking the first instrument for a period of time, and wherein the period of time is based on the fraud severity value.

In further exemplary embodiments, the method further comprises receiving application data, by the first processor, from the user device; and adjusting one of the fraud severity value and notification value based on the application data. In addition, the application data comprises one of a current or recent location of the user device. The method can further comprise receiving fraud preferences, by the first processor, from the user device; and adjusting one of the fraud severity value and notification value based on fraud preferences. In addition, the performing a first fraud action, by the first processor, is based on the fraud preferences.

Exemplary embodiments provide a computer-implemented system for fraud monitoring, comprising: a first processor configured to transmit information through a network; and a first server communicatively coupled to the first processor through the network, wherein the first processor is configured to: receive a transaction request associated with a first instrument of a user; extract characteristics of the transaction request; identify user data based on the transaction request; determine a fraud severity value and notification value based on inputting the characteristics and user data into a fraud machine learning model; and perform a first fraud action based on the fraud severity value; wherein the first fraud action is one of locking the first instrument for a period of time, deactivating the first instrument, and electronically transmitting a first query message to a user device associated with the first instrument; and transmit a fraud notification based on the notification value to a second processor associated with a second instrument of the user over a network; wherein the fraud notification includes severity information associated with the fraud severity value.

In addition, the first server is configured to transmit the electronic fraud notification to a plurality of financial institutions. The first server is further configured to transmit the fraud notification based on a fraud preferences. The fraud preferences are set by the user associated with instrument. Further, the first and second instrument are associated with a same financial institution.

Exemplary embodiments provide a non-transitory computer-accessible medium having stored thereon computer-executable instructions, wherein the computer arrangement comprises a processor, and wherein, upon execution of the instructions, the computer arrangement is configured to perform procedures comprising: receiving a transaction request associated with a first instrument of a user; extracting characteristics of the transaction request; identifying user data based on the transaction request; determining a fraud severity value and notification value based on inputting the characteristics and user data into a fraud machine learning model; performing a first fraud action based on the fraud severity value; wherein the first fraud action is one of locking the first instrument for a period of time, deactivating the first instrument, and electronically transmitting a first query message to a user device associated with the first instrument; and transmitting a fraud notification based on the notification value to a second processor associated with a second instrument of the user over a network; wherein the fraud notification includes severity information associated with the fraud severity value.

BRIEF DESCRIPTION OF THE DRAWINGS

Various embodiments of the present disclosure, together with further objects and advantages, can best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present disclosure provides a computer implemented method and system for detecting a fraud event based on transaction data and/or other data, applying a machine learning model to determine a fraud severity value, performing a fraud action based on the fraud event and fraud severity value, and generating and transmitting a fraud notification to other affected institutions based on the fraud event and fraud severity value.

Benefits of the system and methods disclosed herein include utilizing machine learning to identify, extract, and analyze patterns from large datasets of transactions. This information can reveal insights that can be used to determine whether a particular transaction request is likely to be fraudulent and allow for the interception of the particular transaction and prevention of future additional transactions.

In addition, the systems and methods disclosed herein address the necessity of alerting other entities and institutions whenever a transaction is determined to be likely fraudulent. The systems and methods further specify that the dataset can include information shared between various entities, and include previous notifications of suspected fraudulent transactions in the dataset used to train a fraud detection machine learning model. Thus the robust fraud model, as well as the other features described herein, provide an efficient and accurate fraud detection and notification system and method for the prevention of fraud relating to events that can affect multiple entities. Such events can include, without limitation, identity theft, data breaches, theft of sensitive documents, and lost or stolen wallets.

Figure 1A:
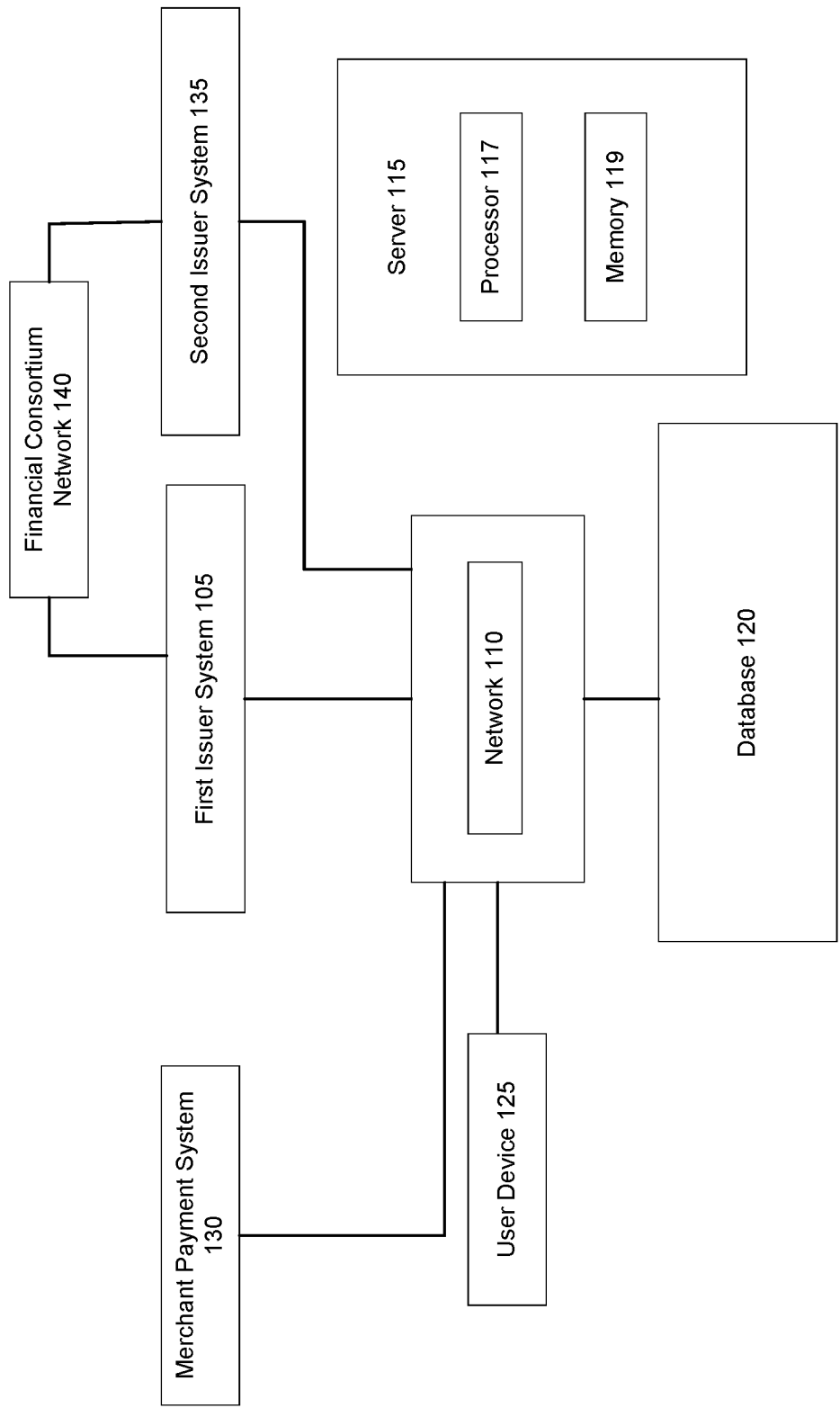
FIG. 1A illustrates an exemplary system for detecting a fraud event and transmitting fraud notifications.

FIG. 1A illustrates an exemplary system 100 for detecting a fraud event and transmitting fraud notifications to disparate entities pertaining to a user. The system 100 can comprise a first issuer system 105, network 110, server 115, database 120, user devices 125, merchant payment system 130, second issuer system 135, and financial consortium network 140. FIG. 1A may reference the same or similar components, and data as the user device 125 in FIG. 1B, the first issuer system in FIG. 1C, the process illustrated in FIGS. 2 and 3 and the sequences illustrated in FIG. 4.

The system 100 can include one or more network 110. In some examples, network 110 can be one or more of a wireless network, a wired network or any combination of wireless network and wired network, and can be configured to connect to any one of components of system 100. In some examples, network 110 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 can include, without limitation, telephone lines, fiber optics, IEEE Ethernet 902.3, a wide area network, a wireless personal area network, a LAN, or a global network such as the Internet. In addition, network 110 can support an Internet network, a wireless communication network, a cellular network, or the like, or any combination thereof. Network 110 can further include one network, or any number of the exemplary types of networks mentioned above, operating as a stand-alone network or in cooperation with each other. Network 110 can utilize one or more protocols of one or more network elements to which they are communicatively coupled. Network 110 can translate to or from other protocols to one or more protocols of network devices. Although network 110 is depicted as a single network, it should be appreciated that according to one or more examples, network 110 can comprise a plurality of interconnected networks, such as, for example, the Internet, a service provider's network, a cable television network, corporate networks, such as credit card association networks, and home networks.

System 100 can further comprise one or more servers 115. In some examples, the server 115 can include one or more processors 117 coupled to memory 119. The server 115 can be configured as a central system, server or platform to control and call various data at different times to execute a plurality of workflow actions. The server 115 can be configured to connect to any component of system 100 via network 110. The server 115 can be a dedicated server computer, such as bladed servers, or can be personal computers, laptop computers, notebook computers, palm top computers, network computers, mobile devices, wearable devices, or any processor-controlled device capable of supporting the system 100. While FIG. 1A illustrates a single server 115, it is understood that other embodiments can use multiple servers or multiple computer systems as necessary or desired to support the users and can also use back-up or redundant servers to prevent network downtime in the event of a failure of a particular server.

The server 115 can be in data communication with the processor 102. For example, a server 115 can be in data communication with First issuer system 105 via one or more networks 110. The First issuer system 105 can transmit one or more requests to the server 115. The one or more requests can be associated with retrieving data from the server 115. The server 115 can receive the one or more requests from any component of First issuer system 105. Based on the one or more requests from, for example the processor 102, the server 115 can be configured to retrieve the requested data. The server 115 can be configured to transmit the received data to the processor 102, the received data being responsive to one or more requests.

In some examples, the server 115 can be a dedicated server computer, such as bladed servers, or can be personal computers, laptop computers, notebook computers, palm top computers, network computers, mobile devices, wearable devices, or any processor-controlled device capable of supporting the system 100. While FIG. 1A illustrates a server 115, it is understood that other embodiments can use multiple servers or multiple computer systems as necessary or desired to support the users and can also use back-up or redundant servers to prevent network downtime in the event of a failure of a particular server.

The server 115 can include a processor 117. The processor 117 can be, for example, one or more microprocessors. The processor 102 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The server 115 can include an application comprising instructions for execution thereon (not shown). For example, the application can reside in memory 119 of server 115 and can comprise instructions for execution on the server 115. The application of the server 115 can be in communication with any components of system 100. For example, server 115 can execute one or more applications that enable, for example, network and/or data communications with one or more components of system 100 and transmit and/or receive data. Without limitation, the server 115 can be a network-enabled computer. As referred to herein, a network-enabled computer can include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The server 115 also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 115 can include processing circuitry and can contain additional components, including processors, memories, error and parity/CRC checkers, data encoders, anticollision algorithms, controllers, command decoders, security primitives and tamperproofing hardware, as necessary to perform the functions described herein. The server 115 can further include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's user device that is available and supported by the user's user device, such as a touch-screen, keyboard, mouse, cursor-control device, touch-screen, microphone, digital camera, video recorder or camcorder. These devices can be used to enter information and interact with the software and other devices described herein.

System 100 can include one or more databases 120. The database 120 can comprise a relational database, a non-relational database, or other database implementations, and any combination thereof, including a plurality of relational databases and non-relational databases. In some examples, the database 120 can comprise a desktop database, a mobile database, or an in-memory database. Further, the database 120 can be hosted internally by any component of system 100, such as the First issuer system 105, or server 115, or the database 120 can be hosted externally to any component of the system 100, such as the First issuer system 105, or server 115, by a cloud-based platform, or in any storage device that is in data communication with the First issuer system 105 and server 115. In some examples, the database 120 can be in data communication with any number of components of system 100. For example, the server 115 can be configured to retrieve the requested data from the database 120 that is transmitted by the processor 102. Server 115 can be configured to transmit the received data from database 120 to the processor 102 via network 110, the received data being responsive to the transmitted one or more requests. In other examples, the processor 102 can be configured to transmit one or more requests for the requested data from database 120 via network 110.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first issuer system 105, server 115, and/or database 120, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

System 100 can further include a merchant payment system 130 used to facilitate transactions between a first issuer system 105 and a user's payment instrument. Merchant payment system 130 can include a point of sale (POS) system, including a debit/credit card reader and processing system that transmits transaction information to the first issuer system via network 110. In the case of communications between the merchant payment system 130 and first issuer system 105 the network 110 can be the automated clearing house (ACH) network and/or similar kinds of networks. Merchant payment system 130 can also be associated with e-commerce merchants for transactions conducted over the internet by a user. Merchant payment system 130 can include the hardware and software necessary for facilitating transactions between first issuer system 105 and a user's payment instrument via merchant payment system 130.

System 100 can further include a financial consortium network 140. Financial consortium network 140 can facilitate communication between a plurality of disparate entities, such as financial institutions, and other issuers. Financial consortium network 140 can include the features and characteristics as described with respect to network 110 herein. In addition, financial consortium network can be provided on a decentralized network utilizing, for example, the block chain protocol that includes a distributed ledger.

Figure 1B:
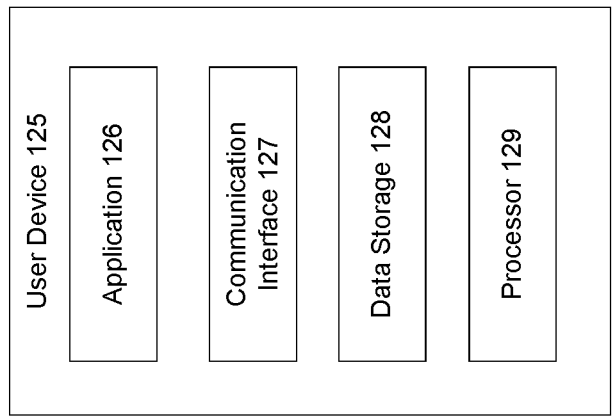
FIG. 1B illustrates components of an exemplary user device.

Reference is now made to FIG. 1B, which depicts components of an exemplary user device 125 shown in FIG. 1A. FIG. 1B may reference the same or similar components, and data as the system 100 in FIG. 1A, the first issuer system 105 in FIG. 1C, the process illustrated in FIGS. 2 and 3 and the sequences illustrated in FIG. 4.

The user device 125 can include a network-enabled computer system and/or device. As referred to herein, a network-enabled computer system and/or device can include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a smart card, or other device. The network-enabled computer systems can execute one or more software applications to, for example, receive data as input from an entity accessing the network-enabled computer system, process received data, transmit data over a network, and receive data over a network.

The user device 125 can include at least one processor 129, which can be a central processing unit (CPU), which can be configured to execute computer program instructions to perform various processes and methods. The at least one CPU can comprise several processors, a single processor, or a single device having multiple processors.

The user device 125 can include a data storage 128, including for example, random access memory (RAM) and read only memory (ROM), which can be configured to access and store data and information and computer program instructions. The data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email account application and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which can include an all flash array, a hybrid array, or a server-side product, enterprise storage, which can include online or cloud storage, or any other storage mechanism.

The data storage 128 can be a read-only memory, write-once read-multiple memory or read/write memory, e.g., RAM, ROM, and EEPROM, and the user device 125 can include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it can not be rewritten, but it can be read many times. A read/write memory can be programmed and re-programed many times after leaving the factory. It can also be read many times.

Although depicted as single elements, it should be appreciated that according to one or more embodiments, the user device 125 can comprise a plurality of user devices 125. As shown in FIG. 1A, the user device 125 can include various components. As used herein, the term "component" can be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components can be combined, integrated, separated, or duplicated to support various applications. Also, a function described herein as being performed at a particular component can be performed at one or more other components and by one or more other devices instead of or in addition to the function performed at the particular component. Further, the components can be implemented across multiple devices or other components local or remote to one another. Additionally, the components can be moved from one device and added to another device, or can be included in both devices.

The user device 125 can be any device capable of communicating via, for example, Bluetooth technology, NFC technology, WiFi Direct technology, and/or the like. The user device 125 can be associated with a user and can be configured to execute various functions to transmit and receive user data (e.g., security questions, answers to security questions, card number, account type, account balance, account limits, budget data, recent transactions, and/or the like). For example, the user device 125 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass® or Samsung Galaxy® Gear Smartwatch, devices running Microsoft's Windows® Mobile operating system, and/or any other smartphone, smartwatch, tablet, or like device, which can include personal assistant devices incorporating systems, such as Alexa, Siri, Google Assistant, and Microsoft Cortana, including home assistant devices such as Amazon Echo, Google Home, and the like.

The user device 125 can include components to send and/or receive data for use in other components, such as a communication interface 127. The communication interface 127 can include various hardware and software components, such as, for example, a repeater, a microwave antenna, or another network access device capable of providing connectivity between network mediums. The communication interface 127 can also contain various software and/or hardware components to enable communication over the network 110. For example, the communication interface 127 can be capable of sending or receiving signals via the network 110. Moreover, the communication interface 127 can provide connectivity to one or more wired networks and can be capable of receiving signals on a first medium (such as a wired network) and transmitting the received signals on a second medium (such as a wireless network). One or more users can access the network 110 through one or more user devices 125 that can be communicatively coupled to the network 110.

A current location of the user device 125 can be determined using many different technologies such as Global Positioning System (GPS) technology, Internet-based technology, etc., which can utilize location data. By way of example, location data can include, but is not limited to GPS data, assisted GPS data, IP address data, cell identification data, received signal strength indication (RSSI) data, wireless fingerprinting data, inertial sensor data (e.g., compass or magnetometer data, accelerometer data, and/or gyroscope data), barometer data, ultrasonic data (e.g., radio-frequency identification (RFID) data, near-field communication (NFC) data), Bluetooth data, and/or terrestrial transmitter data.

The user device 125 can also include various software components to facilitate the functionalities described herein, including an application processor (not shown in FIG. 1B). For example, the user device 125 can include an operating system such as, for example, the iOS® operating system from Apple®, the Google® Android® operating system, and the Windows Mobile® operating system from Microsoft®. The user device 125 can also include, without limitation, software application(s) 126 such as web browsing applications, email account applications, and mobile banking applications, an NFC application programming interface, and software to enable touch sensitive displays. User device manufacturers can provide software stacks or APIs which allow software applications to be written on top of the software stacks. For example, user device manufacturers can provide, without limitation, a card emulation API to enable NFC card emulation mode, a logic link control protocol (LLCP) API for peer-to-peer communication between user devices, a Bluetooth® API supporting Bluetooth Low Energy (BLE), and a real-time data (RTD) API and a NFC Data Exchange Format (NDEF) API for reading/writing.

The data used in the application 126 can be transmitted, for example, from external data sources. The application 126 can leverage information from public data sources, which can include traffic, weather, financial, legal data information and the like, as well information about an account or account holder, information about a merchant and/or other parties involved in a transaction, rewards information, promotional information, advertising information, and other useful information. The application 126 can be integrated with or separate from a wallet application, which can be utilized to seamlessly facilitate transactions.

Figure 1C:
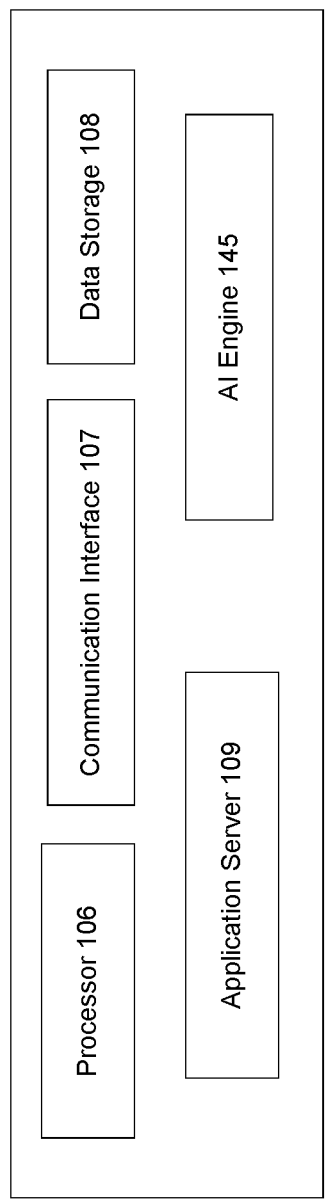
FIG. 1C illustrates components of an exemplary first issuer system.

As depicted in FIG. 1C, the first issuer system 105 can include a processor 106, a communication interface 107, a data storage 108, an application server 109, and an artificial intelligence (AI) engine 145. The first issuer system 105 can include data and/or components, systems, and interfaces, including application programming interfaces (APIs) to enable the generation, transmission, and processing of data. FIG. 1C may reference the same or similar components, and data as the system 100 in FIG. 1A, the user device 125 in FIG. 1B, the process illustrated in FIGS. 2 and 3 and the sequences illustrated in FIG. 4.

The first issuer system 105 can include a network-enabled computer system and/or device. The network-enabled computer system can execute one or more software applications to, for example, receive data as input from an entity accessing the network-enabled computer system, process received data, transmit data over a network, and receive data over a network.

The first issuer system 105 can include at least one processor 106, which can be a central processing unit (CPU), which can be configured to execute computer program instructions to perform various processes and methods. The at least one CPU can comprise several processors, a single processor, or a single device having multiple processors.

The first issuer system 105 can include a data storage 108, including for example, random access memory (RAM) and read only memory (ROM), which can be configured to access and store data and information and computer program instructions. The data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser applications, email account applications and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which can include an all flash array, a hybrid array, or a server-side product, enterprise storage, which can include online or cloud storage, or any other storage mechanism.

The data storage 108 can be a read-only memory, write-once read-multiple memory or read/write memory, e.g., RAM, ROM, and EEPROM, and the first issuer system 105 can include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it can not be rewritten, but it can be read many times. A read/write memory can be programmed and re-programed many times after leaving the factory. It can also be read many times.

Although depicted as single elements, it should be appreciated that according to one or more embodiments, the first issuer system 105 can comprise a plurality of first issuer systems 105. As shown in FIG. 1C, the first issuer system 105 can include various components. The components can be combined, integrated, separated, or duplicated to support various applications. Also, a function described herein as being performed at a particular component can be performed at one or more other components and by one or more other devices instead of or in addition to the function performed at the particular component. Further, the components can be implemented across multiple devices or other components local or remote to one another. Additionally, the components can be moved from one device and added to another device, or can be included in both devices.

The first issuer system 105 can include components to send and/or receive data for use in other components, such as a communication interface 107. The communication interface 107 can include various hardware and software components, such as, for example, a repeater, a microwave antenna, or another network access device capable of providing connectivity between network mediums. The communication interface 107 can also contain various software and/or hardware components to enable communication over the network 110. For example, the communication interface 107 can be capable of sending or receiving signals via the network 110. Moreover, the communication interface 107 can provide connectivity to one or more wired networks and can be capable of receiving signals on a first medium (such as a wired network) and transmitting the received signals on a second medium (such as a wireless network).

The application server 109 can include hardware and/or software that is dedicated to the efficient execution of procedures (e.g., programs, routines, scripts) for supporting its applied applications. The application server 109 can comprise one or more application server frameworks, including, for example, Java application servers (e.g., Java platform, Enterprise Edition (Java EE), the .NET framework from Microsoft®, PHP application servers, and the like). The various application server frameworks can contain a comprehensive service layer model. The application server 109 can support the construction of dynamic pages. The application server 109 also can implement services, such as, for example, clustering, failover, and load balancing. In various embodiments, where the application server 109 are Java application servers, the application server 109 can behave like an extended virtual machine for running applications, transparently handling connections to databases on one side, and connections to the web client (e.g., user device 125) on the other side.

The AI engine 145 can receive transaction data (e.g. transaction requests, and completed transactions), associated personal, financial and fraud information from data storage 108 and/or database 120 and/or server 115, as depicted in FIG. 1A. AI engine can alternatively, or in addition to, receive such data from one of user device, one or more second issuers, and/or financial consortium network. AI engine 145 can utilize AI technologies to parse and process transaction, personal, fraud, and/or financial data to extract conditionally relevant meaning from such data. For example, the AI engine 145 can identify and format various fields of data (e.g. merchant names, transaction items, and the like in transaction data), and can utilize natural language processing technologies to process the data to extract conditionally relevant meaning from the data. The AI engine 145 can combine processed transaction, financial, fraud, and personal data from a plurality of users and payment instruments into a training dataset to a fraud machine learning model.

The processed data can be aggregated across the one or more data sources. The AI engine 145 can continuously evaluate the aggregated data to determine whether the one or more conditions is met. To minimize system resources, the first issuer system 105 can store the compressed aggregated data in the data storage 108. The compressed aggregated data can include the associated conditionally relevant meaning verification and associated metadata necessary to establish proof of occurrence of the condition, rather than the raw received input data. Specifically, the first issuer system 105 can automatically determine whether data is consequential by evaluating whether the data is pertinent to determining whether a condition has been met and/or is associated with data that does not satisfy a condition. Inconsequential data can be purged by the first issuer system 105 to save storage space. For example, transaction, personal, financial, and/or fraud data which is redundant of information already stored in data storage 108 can be purged. Consequential data can include data of previously processed transaction, personal, fraud, and/or financial data can be utilized to predict a likelihood of fraud of transaction requests as they are submitted by merchant payment system to first issuer system.

The AI engine 145 can also transmit, or cause transmit text messages, emails, or other forms of communication to the user device 125.

The first issuer system 105 can be associated with a particular financial services company, and can issue a payment instrument to a user. A payment instrument can include a credit card, debit card, and any other kind of payment card. Alternatively, the payment instrument can comprise a digital wallet provided on an application of the user device. The digital wallet application can be provided via application server 109 of the first issuer system. First issuer system can also provide an application on the user device via application server 109 for managing transactions associated with their payment card (and/or digital wallet), and/or for managing a fraud monitoring and notifications service as described herein. Fraud monitoring and notification service can be accessed via an application 126 on user device 125 as depicted in FIG. 1B.

The first issuer system 105 can have differentiated access to other third party systems (such as one or more second issuer system 135, which can, for example, be associated with different financial entities, or different lines of business of the same financial institution (or other entity) associated with the first issuer system 105), including public data source systems via private APIs. The first issuer system 105 can also have differentiated access to user devices (e.g., the user devices 125) via private device APIs. The first issuer system 105 can make calls to the private APIs utilizing a token to provide a secure communication channel between the first issuer system 105 and other third party systems. The device APIs can also provide a secure communication between the user device 125 and the first issuer system 105.

One or more fraud models can be developed by one or more machine learning algorithms and generated by the application of by one or more predictive models. In an embodiment, the machine learning algorithms employed can include at least one selected from the group of gradient boosting machine, logistic regression, neural networks, and a combination thereof, however, it is understood that other machine learning algorithms can be utilized.

For example, to generate predictions pertaining to the likelihood of fraud and the necessity of transmitting a fraud notification to other entities, one or more predictive models can utilize information relating to the variables described herein, including without limitation, the frequency, and nature of fraudulent activity detected from a large data set of transactions across a segment of the population, and the correlations in the transactional and personal details associated with such fraudulent activity.

The predictive models described herein can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

Alternatively, the predictive models described herein can utilize various neural networks, such as convolutional neural networks (CNNs) or recurrent neural networks (RNNs), to generate the exemplary models. A CNN can include one or more convolutional layers (e.g., often with a sub sampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feed forward neural network, while an infinite impulse recurrent network can be, or can include, a directed cyclic graph that can not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks (LSTMs) and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The predictive models described herein can be trained on one or more training datasets, each of which can comprise one or more types of data. The training data can comprise of a plurality of transaction data (e.g. transactions submitted from one or more issuer systems between one or merchant payment system for the payment of a good or service using a payment instrument) from a plurality of different users and payment instruments, and personal and other information associated with the users. In some examples, the training datasets can comprise previously-collected data, such as data collected from previous uses of the same type of systems described herein and data collected from different types of systems. In other examples, the training datasets can comprise continuously-collected data, including continuously collected transaction, personal, and other related data. In some examples, the training dataset can include anticipated data, such as the anticipated fraudulent transactions, and other transactions and related data. In other examples, the training datasets can include previous fraud predictions for the instant system and other types of system, and can further include results data indicative of the accuracy of the previous fraud predictions. In accordance with these examples, the predictive models described herein can be training prior to use and the training can continue with updated data sets that reflect additional information.

Examples of predictive models that can be implemented include a hidden Markov model, a Gaussian mixture model, a pattern matching algorithm, a neural network, a matrix representation, (a vector quantization and decision tree, a supervised learning model, an unsupervised learning model, a semi-supervised learning model, a reinforcement learning model, a self-learning model, and a feature learning model.

The second issuer system 135 can include substantially similar components as the first issuer system. The system 100, as shown in FIG. 1A, contemplates a plurality of second issuer systems 135 being communicatively coupled to the first issuer system 105, through network 110 and/or financial consortium network 140 in order to provide a robust fraud detection and notification network. The one or more second issuer systems can be associated with the same or a different entity (e.g. banking, credit card, or other financial institution) than the first issuer system. In the case where first and second issuer system are associated with the same entity, first and second issuer system may each be associated with different lines of business.

Figure 2:
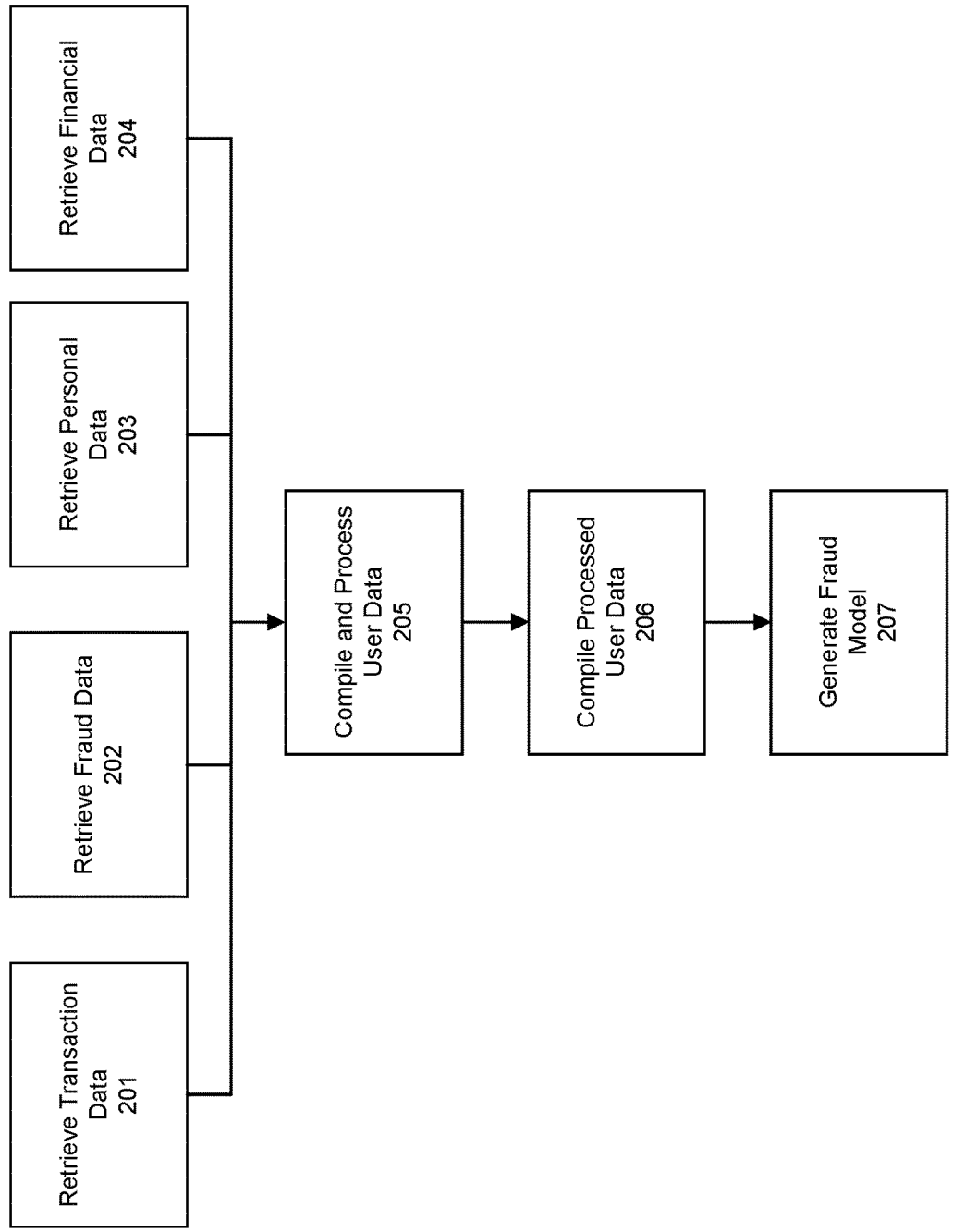
FIG. 2 illustrates an exemplary process for generating a fraud model using machine learning methodologies in exemplary embodiments.

FIG. 2 depicts an exemplary process for generating a fraud model using machine learning methodologies in exemplary embodiments. FIG. 2 may reference the same or similar components, and data as the system 100 in FIG. 1A, the user device 125 in FIG. 1B, the first issuer system in FIG. 1C, the process illustrated in FIG. 3 and the sequences illustrated in FIG. 4. A fraud model can be used by the first issuer system to assign a fraud severity value based on a transaction request. The fraud severity value provides an indication of the likelihood that a particular transaction request is a fraudulent transaction. The fraud severity value represents a fraud prediction—i.e. the likelihood that particular transaction request is a fraudulent one. The fraud model can advantageously be trained before a transaction request is received, and stored by the first issuer system, so that the first issuer system can quickly and accurately assign a fraud score and take an appropriate action to alleviate the fraud upon receiving a transaction request.

As depicted in FIG. 2, the AI engine may retrieve data from a variety of sources pertaining to a user associated with a payment instrument, and compile such data as user data. Exemplary data sources include, without limitation personal and financial information inputted by the user in an application associated with first issuer system accessible on the user's user device, or that is otherwise provided by the user to the first issuer system (e.g. when initially applying for a payment instrument), fraud notifications received from one or more second issuer systems, or via financial consortium network, and fraud, transaction data and related data provided by one or second financial institutions, through financial consortium network, or from some other source.

At step 201, the AI engine can retrieve transaction data associated with a particular user and/or a particular payment instrument. Transaction data may include characteristics of previous transactions (and/or transaction requests), including payment instrument type, transaction amount, absolute location, location relative to home address, merchant name, merchant type, other merchant details, transaction name (e.g. the name of the good or service transacted for), transaction type (e.g. the type of good or service which the transaction request pertains to), merchant payment system type (e.g., type of POS system, automated teller machine (ATM), kiosk, or internet provider), time, and date, transaction frequency (how often the payment instrument is used), last used transaction (including the location thereof), average transaction amount, total number of transactions, and other transaction metrics.

At step 202, the AI engine can retrieve fraud data associated with the transaction data. Fraud data can include a fraud status associated with a particular transaction. The fraud status can indicate, for example, whether a fraudulent activity has been detected by an issuer system, whether a user has confirmed, unconfirmed, or denied such a detection, and/or whether a fraud event has been independently reported by the user associated with the transaction.

Fraud data can include one or more fraud type(s) if known. For example, a fraud type can be a check fraud, debit card fraud, ACH fraud, wire fraud, credit card fraud, ATM fraud, prepaid card fraud, identify theft, and fraud related to lost or stolen cards or information.

Fraud data can also include a fraud impact data associated with a particular transaction, which can, for example, indicate the number and type of other payment instruments known to have been impacted by a fraud event associated with the particular transaction, and the number of an type of other fraudulent events known to have occurred with a particular payment instrument associated with the transaction, including whether other fraud notifications have been transmitted with respect to the particular payment instrument, and the identity of particular entities (e.g. one or more second issuer systems) who transmitted such fraud notifications. Fraud impact data can be transmitted from one or more second issuer systems via a financial consortium network, and/or shared generally between all participants within a financial consortium network.

Fraud data can also include fraud metrics, which can include information pertaining to how often the user has been subjected to fraud, how frequently fraudulent events have occurred to the user, and other metrics relating to the occurrence of fraudulent events and the specific user.

At step 203 AI engine may retrieve personal data associated with the transaction data. Personal data may include the address, location, gender, age, and other characteristics of the user associated with the transaction data. Personal data can be inputted by the user upon application for a payment instrument from the first issuer, or can be inputted to the first issuer system after the payment instrument has been issued, such as through a software application associated with the first issuer system accessible on the user's user device. Personal information may be stored in data storage of the first issuer system, or can be stored in a server or database accessible via a network by the first issuer system.

At step 204, the AI engine may retrieve financial data associated with the transaction data. Financial data may include information relevant to a user's finances, including the income, credit score, payment instrument account information, and other information pertaining to the financial status of the user at the time of each of the transactions in the transaction data. Payment instrument account information can include, for example, the amount available in a debit account, savings account, or brokerage account, a credit limit, and information about any debt of the user. Financial data may be stored in data storage of the first issuer system, or can be stored in a server or database accessible via a network by the first issuer system.

At step 205 the AI engine may compile transaction data, fraud data, personal data, and financial data into user data, and process the user data for use in a training set. The user data may be processed so that, for example, each transaction is associated with relevant personal data, and financial data, and any available fraud data is also associated with the transaction. The AI engine can utilize natural language processing (NLP) to, for example, more accurately classify and categorize certain user data. For example, the AI engine may use NLP processing to and identify the merchant name and type, transaction name and type, merchant payment system name and type, provided in the transaction data. The transactions (and transaction requests) in the user data may not use uniform names for such characteristics. In such a case, the AI engine may utilize NLP processing techniques including named entity recognition, co-reference resolution, and other NLP techniques to standardize transaction data.

At step 206 the AI engine may compile processed user data for a plurality of users, and combine into global data. The global data can be of other users having one or more payment instruments associated with first issuer system. In addition, the global data can originate from one or more global second issuer system or other source.

At step 207, the AI engine may utilize global data as a training set in a machine learning model to generate a fraud model. The fraud model can be arranged as a data structure that can be used to quickly and accurately determine a fraud severity value and a notification value taking at least characteristics of a transaction request as inputs. The fraud severity value can represent the likelihood that a particular transaction request is fraudulent, and the notification value can represent the necessity of warning one or more second issuer systems about the fraud.

The fraud model can reflect the correlation of different characteristics of global data with the occurrence of fraud data in the global data set (e.g. fraud being detected, reported, and/or where a user's other payment instruments were compromised) to determine a fraud severity value. The type of fraud data included in the global data can also reflect severity of fraud. For example, transactions where fraud is only detected, but not confirmed can be considered less severe than transactions where fraud is confirmed by the user.

The fraud model can also reflect the correlation of different characteristics of global data with the occurrence of fraud impact data (e.g. reports of fraud where a user's other payment instruments were compromised) to determine a notification value.

The fraud model can also reflect hidden relationships and patterns discovered in the global data set via machine learning. For example, machine learning techniques may discover insights into different ranges of transaction amounts that indicate the severity of fraud, depending on yearly income levels, home address, and/or frequency of use of payment instrument which can be reflected in the fraud model. The fraud model can also reflect patterns of particular types of transactions, or of particular types of users, who are more likely to be subject to a fraudulent event that compromises one specific type of other payment instrument (e.g. a credit card), but not another type of payment instrument (e.g. a digital wallet).

The AI can construct fraud models unique to a specific user, a particular plurality of users (e.g., a plurality of similarly situated users), or a general fraud model that can be used for a variety of users. If a fraud model is general, it can require more inputs in order to make accurate fraud predictions about transaction requests of a particular user and/or payment instrument.

Figure 3:
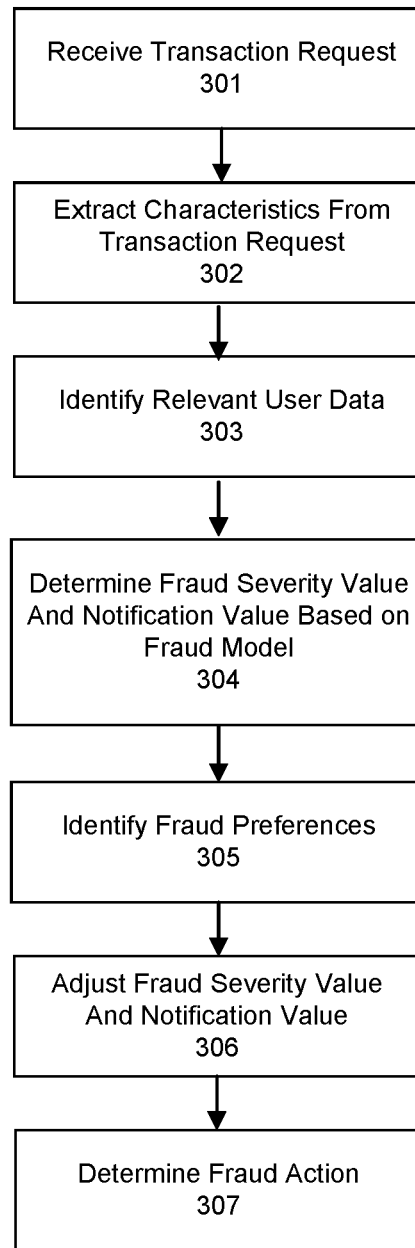
FIG. 3 illustrates an exemplary process for a fraud monitoring and notification system.

Reference is now made to FIG. 3, which depicts an exemplary process for a fraud monitoring and notification system. FIG. 3 may reference the same or similar components, and data as the system 100 in FIG. 1A, the user device 125 in FIG. 1B, the first issuer system in FIG. 1C, the process illustrated in FIG. 2 and the sequences illustrated in FIG. 4. The sequence diagram 400 At step 301 the first issuer system can receive a transaction request associated with a particular user's payment instrument from a merchant payment system. The transaction request can be received from the merchant payment system to the first issuer system upon an attempt to conduct a transaction with the payment instrument.

At step 302, the first issuer system can extract characteristics from the transaction request. Characteristics can include, for example, payment instrument type, transaction amount, absolute location, location relative to home address, merchant name, merchant type, other merchant details, transaction name (e.g. the name of the good or service transacted for), transaction type (e.g. the type of good or service which the transaction request pertains to), merchant payment system type (e.g., type of POS system, ATM/kiosk, or internet provider), time, date last transaction date and time, and transaction frequency of use.

At step 303, the first issuer system may identify relevant user data pertaining to the user associated with the payment instrument in the received transaction request. The relevant user data may include one or more types of transaction data, personal data, fraud data, and financial data. First issuer system may choose only the relevant user data needed by the fraud model to generate accurate and efficient predictions as to the likelihood of fraud and necessity of alerting other issuers associated with the user. The amount of user data needed depends on the fraud model. Specifically, the extent that the fraud model is tailored to the particular user. The fraud model can advantageously have already been created by the first issuer system before the transaction request is received.

At step 304, the first issuer system may determine a fraud severity value and a notification value by using the extracted characteristics of the transaction request and the identified relevant user data as inputs to the fraud model.

At step 305, the first issuer system can identify fraud preferences and fraud application data when the fraud severity value exceeds a threshold value. Fraud preferences can indicate a preferred communication channel (e.g. SMS, email, call, push notification on user device) for notifications to the user, which types of notifications to provide to the user, fraud actions preferences (e.g. whether a payment card should be automatically locked or deactivated if fraud is detected, and the period of time a card should be locked if fraud is detected), whether certain fraud actions are enabled or disabled, the identity of one or more other payment instruments associated with the user, and any special circumstances of the user relating to fraud (e.g. that the user is travelling, or is expecting to make a large or unusual transaction)). Fraud preferences can be inputted by the user in, for example a software application associated with the first issuer system accessible on user device. In exemplary embodiments, only if the first issuer system determines that there is a high enough chance of fraud occurring (i.e. a fraud severity exceeds a first, minimum, threshold value) will the first issuer system utilize computational resources on identifying particular fraud preferences of the user.

Fraud application data can include a current location of a user device associated with the user, a last known location of the user device, last time using an application of the user device associated with first issuer system, and other metrics pertaining to the user's device, and/or use if the application associated with the first issuer system. Fraud application data can be collected by the application associated with the first issuer system accessible on the user device via API calls.

At step 306 the fraud severity value and notification value can be adjusted based on fraud preferences and application data by the first issuer system. For example, if the fraud preferences indicate that the user has set a travel notification (that they will travelling in a foreign country) the first issuer system may lower the fraud severity value and/or notification value to reflect such a circumstance. As another example, any deviation in the proximity between a current or recent location indicated in the application data to a location contained in the transaction request can be considered by the first issuer system in adjusting the fraud severity value and/or notification value. If the current location in the application data is substantially different than a location indicated in the transaction request, the fraud severity value and/or notification value can be upwardly adjusted by the first issuer system.

At step 307, the first issuer system may determine a fraud action based on the fraud severity value, notification value, and fraud preferences. A fraud action may include, for example, locking a payment instrument for a certain period of time, deactivating the payment instrument, sending a fraud notification to one or more second issuer systems associated with the user, and/or transmitting a query message indicating that a particular fraud action is or will be taken.

The fraud action can include automatically locking the payment instrument for a certain period of time, or deactivating the card entirely. The first issuer system can perform such a fraud action if the fraud severity value exceeds a first fraud severity threshold value. In this case, the first issuer system can notify the user of fraud action performed via the preferred communication channel. The user's fraud preferences can specify whether this fraud action includes deactivating the payment instrument or merely locking the payment instrument for a period of time. If the latter option is preferred, the user's fraud preferences can specify the period of time that the payment instrument can be locked. Alternatively, the period of time can be proportionate to the magnitude of the fraud severity value.

The fraud action can also include transmitting a query message to the user asking the user whether its payment instrument should be locked or deactivated, and locking or deactivating the user's payment instrument in response to a confirmation to the query message. The first issuer system may determine to use this fraud action if the fraud severity value is less than the first fraud severity threshold value, and greater than a second fraud severity threshold value. The query message can be transmitted to the user via the preferred communication channel specified in the user's fraud preference data.

The fraud action can also include automatically transmitting a fraud notification to one or more second issuer system associated with the user. The first issuer system can determine to perform such a fraud action if the notification value exceeds a first notification threshold value. The one or more second issuers to be notified can be specified in the user's fraud preferences. The fraud notification transmitted to the one or more second issuers can include an identification of the user, the fraud severity value, and fraud severity information, in order to alert the one or more second issuer systems of the severity of suspected fraud. The fraud severity information can include, for example, an identification and/or description of the characteristics of the transaction request which caused the first issuer system to assign a relatively high notification value thereto and other information relevant to the one or more second issuer system in determining an appropriate fraud action for a related payment instrument of the user. The fraud notification can be transmitted directly to each of the one or more second issuers, if specified in the fraud preferences, or can be transmitted to all entities associated with a financial consortium network.

One or more second issuer systems can thereafter perform a fraud action based on the fraud notification. The fraud actions of the one or more second issuer systems can be the same as the ones described with respect to the first issuer system.

The fraud action can also include transmitting a query message to the user asking whether to notify one or more second issuers associated with the user, and notifying the one or more second issuers in response to a confirmation of the query message. The first issuer system can determine to use this fraud action if the notification value is less than the first notification threshold value, and greater than a second notification threshold value. The query message can be transmitted via SMS, phone call, email, or a push notification on an application running on the user's user device associated with the first issuer system. The query message can be transmitted via the preferred communication channel of the user specified in the fraud preferences.

Financial consortium network may include a variety of issuer systems (such as credit card, and debit card, issuers) and other financial entities. Financial consortium network may include a common database or other common data storage, such as a decentralized digital ledger, which contains records of fraud notifications and other related data indicative of fraudulent activity which can accessed by the various entities on the network. Such records can be adhere to applicable privacy, confidentiality and other regulations.

Figure 4:
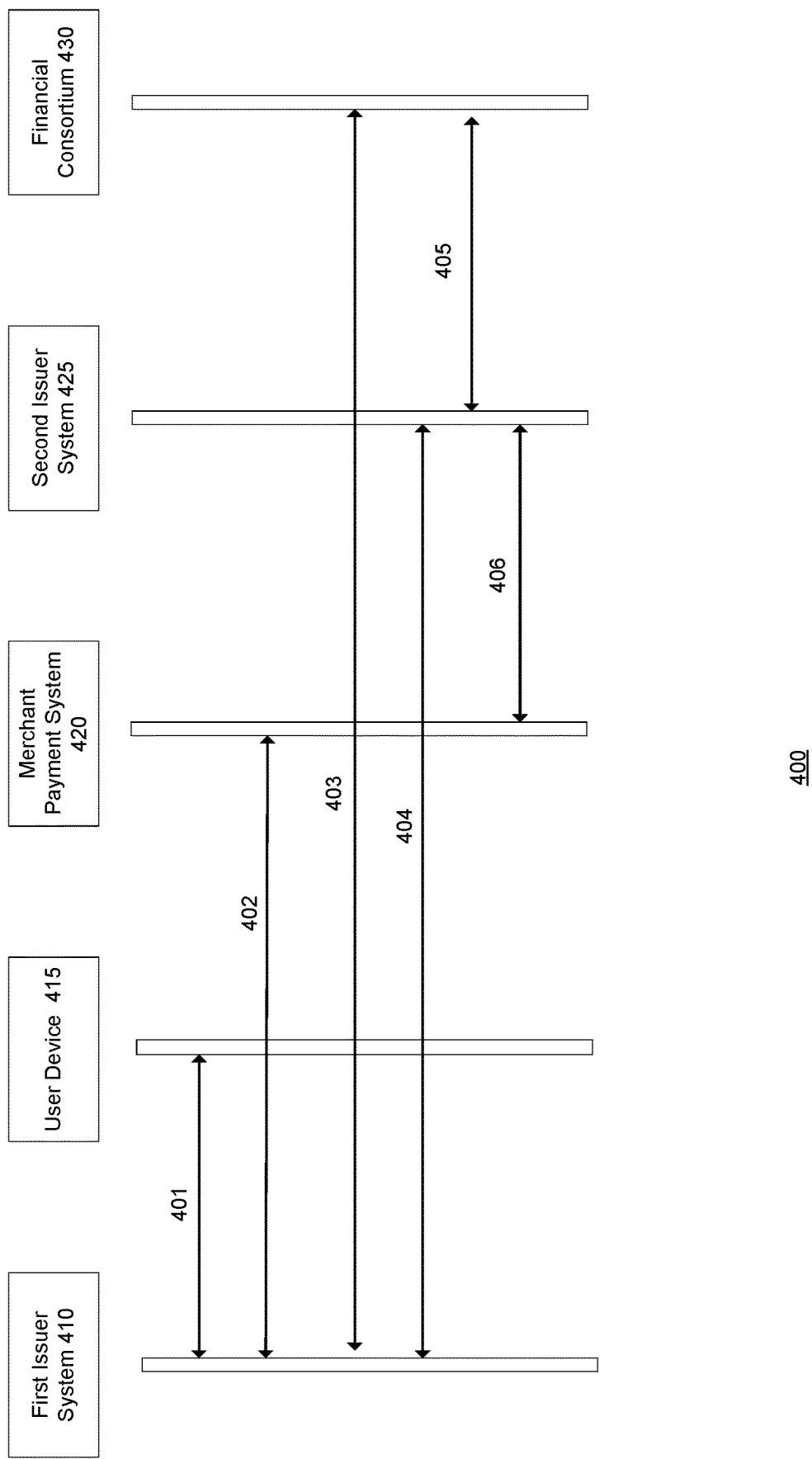
FIG. 4 illustrates a sequence diagram according to an exemplary embodiment.

FIG. 4 illustrates a sequence diagram 400 according to an exemplary embodiment. FIG. 4 may reference the same or similar components, and data as the system 100 in FIG. 1A, the user device 125 in FIG. 1B, the first issuer system in FIG. 1C, the processes illustrated in FIGS. 2 and 3. The sequence diagram 400 may include first issuer system 410, user device 415, merchant payment system 420, second issuer system 425, and financial consortium network 430.

In sequence step 401, first issuer system 410 can be configured to retrieve application data, fraud preferences, and personal data from an application associated with the first issuer system 410 accessible on the user device 415 over a network. First issuer system 410 can also send notifications and queries to user device 415 via SMS, email, automated phone calls, and push notifications over a network to user device 415, and user device 415 can transmit query message responses to first issuer system 410 via the application over a network, SMS, or email.

In sequence step 402, first issuer system 410 can be configured to receive transaction requests from merchant payment system 420, such as a POS system, ATM, kiosk, or merchant internet system. Merchant payment system 420 can receive confirmation information, and other transaction related information from first issuer system 410.

In sequence step 403, first issuer system 410 can be configured to generate and transmit fraud notifications to financial consortium network 430, for distribution to other entities associated with financial consortium network 430 (such as one or more second issuer systems 425). First issuer system 410 can receive fraud notifications from other entities on financial consortium network 430, and take appropriate fraud actions thereafter. First issuer system 410 can also receive information from financial consortium network 430 pertaining to fraud detection that can be used to generate one or more fraud models.

In sequence step 404, first issuer system 410 can be configured to generate and transmit fraud notifications to one or more second issuer systems 425. Likewise, first issuer system 410 can receive fraud notifications from one or more second issuer systems 425. First issuer system 410 and the one or more second issuer systems 425 can also exchange other information pertaining to fraud detection that can be used to generate one or more fraud models.

In sequence step 405, one or more second issuer systems 425 can be configured to send and receive fraud notifications from financial consortium network 430.

In sequence step 406, one or more second issuer systems 425 can be configured to receive transaction requests from merchant payment system 420. Such information may be reflected in fraud notifications and other information pertinent to fraud transmitted by second issuer systems 425 to financial consortium network 430 and/or first issuer system 410.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A computer-implemented method for fraud monitoring, comprising:
   receiving, by a first processor, a transaction request associated with a first instrument of a user;
   extracting, by the first processor, one or more transaction data values from an incoming transaction request, the one or more transaction data values comprising, a payment instrument type, a user identifier associated with the payment instrument, a geographical merchant location and one or more merchant identifiers;
   retrieving one or more application data from the first instrument of the user identified from the transaction request, wherein the one or more application data comprises current and historical location data associated with the first instrument of the user,
   computing a deviation in a proximity between a current location of the first instrument indicated by the application data retrieved from the first instrument of the user, and the geographical merchant location extracted from the transaction request;
   determining, by applying a machine learning model to historical transaction data, one or more correlation values between the one or more transaction data values and one or more fraud data records retrieved from a digital ledger containing a plurality of fraud data records comprising one or more fraud notifications and user fraud reports;
   determining, by the first processor, a fraud severity value, representing a probability that transaction request is fraudulent as a function of the deviation in the proximity and the one or more correlation values;
   performing a first fraud action, by the first processor, based on the fraud severity value; wherein the first fraud action is at least one selected from the group of locking the first instrument for a period of time, deactivating the first instrument, and electronically transmitting, over a network, a fraud notification message to the first instrument of the user when the fraud notification value exceeds a first notification threshold; and
   determining, based on the fraud severity value, and one or more fraud preference values provided by the user, a fraud notification value representing the necessity of warning one or more account issuers about the fraud.

2. The computer-implemented method of claim 1, wherein the machine learning model is trained with a training set comprising transaction data from each of a plurality of instruments associated with the user.

3. The computer-implemented method of claim 1, further comprising electronically transmitting, by the first processor, a fraud notification message to a second instrument of the user when the fraud notification value exceeds a second notification threshold.

4. The computer-implemented method of claim 2, wherein the training set further comprises at least one of a fraud status and fraud type associated with each of the plurality of instruments.

5. The computer-implemented method of claim 2, wherein the transaction data is retrieved by the first processor from a distributed ledger of a decentralized network.

6. The computer-implemented method of claim 2, wherein the transaction data includes information received from one or more user instruments over the network.

7. The computer-implemented method of claim 1, wherein the network is a financial consortium network.

8. The computer-implemented method of claim 1, wherein the first fraud action includes locking the first instrument for a period of time, and wherein the period of time is based on the fraud severity value.

9. The computer-implemented method of claim 1, further comprising:
   receiving application data, by the first processor, from the first instrument of the user; and
   adjusting one of the fraud severity value and the fraud notification value based on the application data.

10. The computer-implemented method of claim 1, further comprising:
    receiving one or more fraud preference values, by the first processor, from the first instrument of the user; and
    adjusting one of the fraud severity value and the fraud notification value based on the one or more fraud preference values.

11. The computer-implemented method of claim 10, wherein the performing the first fraud action, by the first processor, is based on the one or more preferences fraud preferences.

12. The computer-implemented method of claim 1, wherein the one or more transaction data values comprise one or more product identifiers provided in the transaction request.

13. A computer-implemented system for fraud monitoring, comprising:
    a first processor configured to transmit information through a network; and
    a first server communicatively coupled to the first processor through the network,
    wherein the first processor is configured to:
    receive a transaction request associated with a first instrument of a user;
    extract, by the first processor, one or more transaction data values from an incoming transaction request, the one or more transaction data values comprising, an identification of a payment instrument associated with the transaction request, a user associated with the payment instrument, a geographical merchant location and one or more merchant identifiers;
    retrieve one or more fraud application data from the first instrument of the user identified from the transaction request, wherein the fraud application data comprises current and historical location data associated with the first instrument of the user;
    compute a deviation in a proximity between a current location of the first instrument indicated by the application data retrieved from the first instrument of the user, and the geographical merchant location extracted from the transaction request;
    determine, by applying a machine learning model to historical transaction data, one or more correlation values between the one or more transaction data values and one or more fraud data records retrieved from a digital ledger containing a plurality of fraud data records comprising one or more fraud notifications and user fraud reports;
    determine a fraud severity value, representing a probability that transaction request is fraudulent, as a function of the deviation in the proximity and the one or more correlation values;
    perform a first fraud action based on the fraud severity value; wherein the first fraud action is one of locking the first instrument for a period of time, deactivating the first instrument, and electronically transmitting a fraud notification message to the first instrument of the user when the fraud notification value exceeds a first notification threshold; and determine, based on the fraud severity value, and one or more fraud preference values provided by the user, a fraud notification value representing the necessity of warning one or more account issuers about the fraud.

14. The computer-implemented system of claim 13, wherein the machine learning model is trained with a training set comprising transaction data from each of a plurality of instruments associated with the user.

15. The computer-implemented system of claim 13, wherein the first processor is further configured to transmit a fraud notification message to a second instrument of the user when the fraud notification value exceeds a second notification threshold.

16. The computer-implemented system of claim 14, wherein the training set further comprises at least one of a fraud status and fraud type associated with each of the plurality of instruments.

17. A non-transitory computer-accessible medium having stored thereon computer-executable instructions, wherein the computer arrangement comprises a processor, and wherein, upon execution of the instructions, the computer arrangement is configured to perform procedures comprising:

receiving, by a first processor, a transaction request associated with a first instrument of a user;

extracting, by the first processor, one or more transaction data values from an incoming transaction request, the one or more transaction data values comprising, a payment instrument type, a user identifier associated with the payment instrument, a geographical merchant location and one or more merchant identifiers;

retrieving one or more application data from the first instrument of the user identified from the transaction request, wherein the one or more application data comprises current and historical location data associated with the first instrument of the user, computing a deviation in a proximity between a current location of the first instrument indicated by the application data retrieved from the first instrument of the user, and the geographical merchant location extracted from the transaction request;

determining, by applying a machine learning model to historical transaction data, one or more correlation values between the one or more transaction data values and one or more fraud data records retrieved from a digital ledger containing a plurality of fraud data records comprising one or more fraud notifications and user fraud reports;

determining, by the first processor, a fraud severity value, representing a probability that transaction request is fraudulent as a function of the deviation in the proximity and the one or more correlation values;

performing a first fraud action, by the first processor, based on the fraud severity value; wherein the first fraud action is at least one selected from the group of locking the first instrument for a period of time, deactivating the first instrument, and electronically transmitting a fraud notification message to the first instrument of the user when the fraud notification value exceeds a first notification threshold; and determining, based on the fraud severity value, and one or more fraud preference values provided by the user, a fraud notification value representing the necessity of warning one or more account issuers about the fraud.

18. The non-transitory computer-accessible medium of claim 17, further comprising instructions for transmitting a fraud notification message to the first instrument of the user when the fraud notification value exceeds a first notification threshold.

19. The non-transitory computer-accessible medium of claim 17, further comprising instructions for transmitting a fraud notification message to a second instrument of the user when the fraud notification value exceeds a second notification threshold.

20. The non-transitory computer-accessible medium of claim 17, wherein the machine learning model is trained with a training set comprising transaction data from each of a plurality of instruments associated with the user.

* * * * *